Feb. 4, 1969  S. BERK  3,426,142
ELECTRICAL WALL OUTLET
Filed June 6, 1966
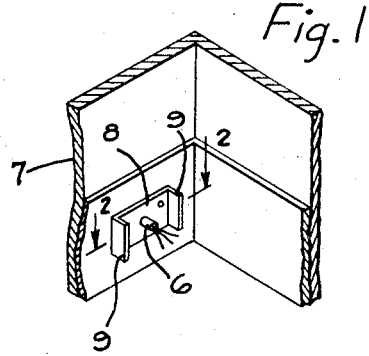
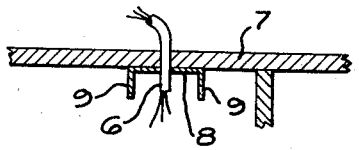
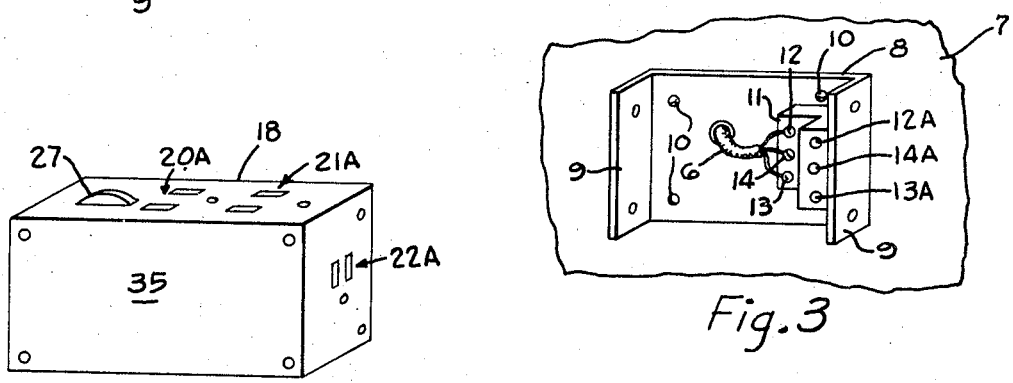
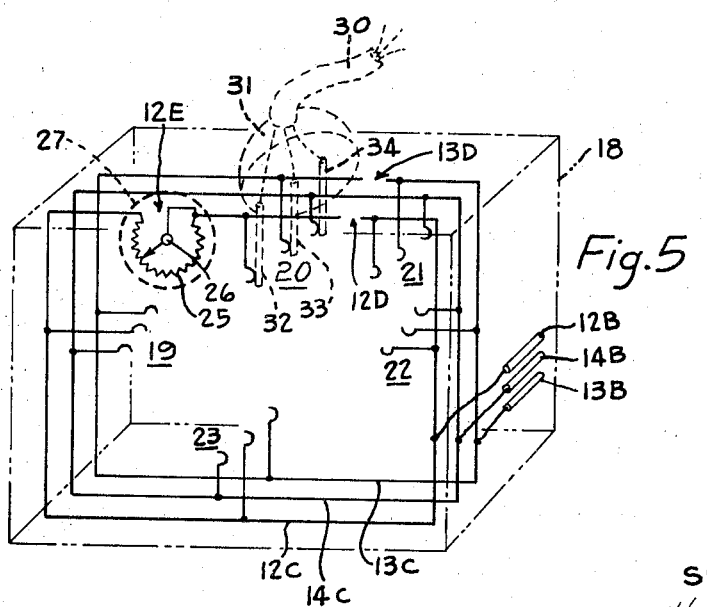
INVENTOR
SIGMUND BERK
ATTORNEYS

United States Patent Office 3,426,142
Patented Feb. 4, 1969

3,426,142
ELECTRICAL WALL OUTLET
Sigmund Berk, Philadelphia, Pa., assignor to the United
States of America as represented by the Secretary of
the Army
Filed June 6, 1966, Ser. No. 556,815
U.S. Cl. 174—58                            4 Claims
Int. Cl. H01r *13/46*

ABSTRACT OF THE DISCLOSURE

A wall outlet box for electrical appliances in which the internal electrical conductor elements form a cage around the inner walls between electrical outlets which are provided in the sides and ends but not on the front face. The open back of the box seats on a wall plate and is secured thereto with electrical contact between the conductor elements and supply connections on the wall plate. Circuit control means for certain outlets are inserted in gaps in the conductor elements.

---

The present invention relates to an electrical wall outlet and has for its primary object to provide an improved outlet of this type.

This is the type of wall outlet which is commonly used in industry and homes for plugging in lamps, electrical appliances and the like. As presently provided, such outlets require a box mounted in the wall below the surface thereof and adapted to receive a flush mounting plate or cover. Within the wall box is mounted a socket unit or receptacle generally for two plugs and having electrical contacts in registration with corresponding openings in the frontal surface of the plate or cover for receiving the prong contact blades of the usual wall plug from lamp or other electrical device or appliance, as the case may be.

Such electrical wall outlets have several disadvantages. First of all, each outlet requires a separate wall box to be mounted in the wall prior to its being finished, and set in place so that the wall itself may be built flush with the top thereof and secondly, the cover and plug outlets face frontally and may be obstructed by furniture or equipment backed up against the outlet and preventing its normal use. Furthermore, such wall outlets as are presently in use provide two plug-in or socket elements, and generally classified as duplex outlets, whereas often times more outlets are required at the location thereof.

It is therefore, an object of the present invention to provide an improved electrical wall outlet which may be utilized as a plug-in outlet for electric current supply even when obstructed by furniture or equipment backed against it, and which, at the same time, is simplified in construction such that no inset wall box is required and the electrical supply lead therefor is merely brought through the wall at the desired outlet location.

It is also a further and important object of this invention to provide an improved electrical wall outlet which provides a multiplicity of electrical plug-in connections in a single device and for at least four or more plugs. It is, therefore, effectively a quadruplex wall outlet instead of the usual duplex wall outlet as provided by the standard construction.

It is also a further object of this invention to provide an improved electrical multiple wall outlet, which may be of box-like moulded plastic construction and adapted for in-built electrical circuit conductors and control means for one or more of the electrical outlets thereof.

In accordance with one form of the invention, an electrical outlet comprises a wall bracket or base carrying electrical supply terminals and a cover element which fits thereover and makes connection therewith for at least four electrical outlets self-contained in the cover element. The unit is preferably of shallow-rectangular form and includes wholly within the cover a plurality of conductors forming a cage around the inner walls thereof between the electrical outlets which are placed on all four sides but not frontally, as before noted. With this type of construction, the electrical wiring lines or conductors throughout a building may be brought out directly through the wall 7 at the desired locations, without any preliminary built-in box construction thereof. The entire electrical outlet is adapted to be mounted on the wall rather than in it, and comprises a flat wall bracket or base plate of thin metallic construction with two upturned ears, and a rectangular cover element of either metal or plastic material which fits thereover and is attached thereto by suitable fastening means.

The invention will further be understood from the following description when considered with reference to the accompanying drawings, and its scope is pointed out in the appended claims.

In the drawing FIG. 1 is a view, in perspective, showing a fragmentary section of a building wall with a bracket or base portion of the outlet box in place, FIG. 2 is a cross-sectional view of the wall construction shown in FIG. 1 taken on the section lines 2—2 to show further details of the electrical outlet and base relations, FIG. 3 is a further view in perspective of the base element of the outlet box with the supply connections in place therein, FIG. 4 is a view, in perspective of a cover element for the outlet box adapted to be placed over the base element shown in FIG. 3 in accordance with the invention, and FIG. 5 is a view, in perspective, of the wiring or circuit conductor of the box of FIG. 4, with the box outlined thereon, and showing the electrical connections therein.

Referring to the drawing, wherein like elements throughout the various figures are indicated by like reference characters, and referring particularly to FIGS. 1, 2 and 3, a current supply lead 6 for an outlet box is brought through the wall 7 of a room at a suitable location such as the base board, with a sufficient length exposed to make connections therewith. The supply cord or conductor is cemented or secured in the wall during its construction as a dry wall or as a plastered wall, as the case may be, in different types of buildings. However, no preliminary outlet box is required but merely the cord or conductor itself extending beyond the surface of the wall for making connection therewith in the basement. Thus the wiring of a house or building is simplified in that no wall boxes are required in advance of locating the electrical outlets where merely the lead itself is brought through the wall or otherwise located at the place where the outlet will be, as in FIGS. 1 and 2 for example, without the base plate which is mounted and connected later.

The base 8 for the outlet consists of a thin flat plate with upturned ears at opposite ends as indicated at 9 and 10 for securing thereto the remainder of the outlet as will be seen. The plate is provided with an opening for the electrical outlet lead and is secured to the wall surface by suitable means, such as screws 10 for example. Between the two ears 9 is located an outlet connection block 11 having terminals 12, 13 and 14 for the present supply cord which has three conductors as is common for power supply circuits, although two, with one grounded is commonly used. In the present example, the conductor or terminal 14 is for ground and the terminals 12 and 13 are for the current supply connections. These terminals are connected with correspondingly located socket or receptacle contacts 12A, 13A and 14A. The terminals 12, 13 and 14 are protected by a detachable elemental of insulating material, here not shown in actual outline in order not to obscure the connections for the lead 6.

Referring now to FIGS. 4 and 5 along with FIGS. 1, 2 and 3, the bracket or plate 8 provides a fixed mounting base with plug-in connection elements for a detachable cover or outlet box 18, of rectangular shape in the present example, adapted to seat thereover against the wall and to be secured by suitable screws (not shown) applied thereto through the ears 9, as indicated by the threaded screw holes 19. Any other suitable fastening means may of course be provided.

The wall box 18 is of hollow-interior construction having electrical wiring conductors extending along or moulded into the inner walls of the sides and ends thereof, in spaced parallel rings between sets of spaced plug receptacles or contacts 19, 20, 21, 22 and 23 which are provided with suitable prong openings 20A, 21A and 22A as shown in FIG. 4 for example. These are energized from fixed plug-in prongs contacts 12B, 13B and 14B in the cover plate which are adapted to engage and connect with the corresponding receptacle or socket contacts 12A, 13A and 14A in the base plate 8. The contacts 12B, 13B and 14B are connected respectively with wiring conductors 12C, 13C and 14C extending around the inner walls of the box 18 along the sides and ends thereof in fixed parallel relation to each other as indicated. Thus these may be of printed circuit construction if desired.

The conductors provide continuous circuit connections around the inner periphery of the box or in the walls thereof if of moulded construction, but may readily be broken at two points such as 12D and 13D for example, to isolate a set of plug contacts 20 for control by variable control means such as resistor 25 having a movable contact 26 for dimming or voltage control. The contact is moved by a thumb wheel 27 which protrudes through the top of the box, whereby the output from a plug in the outlet 20A may be varied on above switch. The control unit is preferably used, as shown, with the contact 26 connected to one terminal of the resistor element 25, thereby to prevent opening the circuit in the extreme low voltage position.

Plug-in connections are made with the different plug receptacles or controls through the conventional connection cords, as indicated in dotted outline at 30, connected to a plug 31 having contacts 32, 33 and 34 respectively for current supply connections and ground. With the terminals 12B, 13B and 14B energized, it will be seen that current applied to the outlet 20 may be controlled by the resistor 25 which is inserted in the lead 12C by making the break therein as indicated at 12E and connecting the resistor between the ends of the break as shown. Thus any of the leads may be opened and suitable control elements connected therein, due to the peripheral construction of the circuitry. Likewise the conductors 12C, 13C and 14C may be provided on a suitable wiring harness and secured to the interior of the box and providing the connections as indicated. In any case the quadruple box shown provides a greater number of outlets than the normal or usual duplex box commonly used in the industry. Circuit connections therewith include only a few circuit conductors arranged around the sides and ends.

It will be noted that the box 18, of rectangular shape is relatively thin whereby it protrudes from the wall to an extent only slightly greater than the thickness or diameter of the plugs used therewith, as indicated in FIG. 5. Each face of the box has at least one outlet or plug-in receptacle, as indicated in the view of FIG. 4 at 20A, 21A and 22A, corresponding to the wiring contacts 20, 21 and 22 in FIG. 5. Other plug-in openings corresponding to the receptacle contacts 19 and 23 are also provided but do not appear in the view of FIG. 4, as is understood.

The box may also have a detachable front cover as indicated at 35 in order more readily to inspect the interior wiring and to facilitate its manufacture and location in the box. The open box is thus placed over the bracket 8 and secured thereto, the prongs or contacts 12B, 13B and 14B entering and engaging the socket contacts 12A, 13A and 14A in the base or bracket 8, and thereby providing electrical connection and energization of the conductors and terminal contacts in the box.

From the foregoing description it will be seen that an electrical wall outlet in accordance with the invention eliminates the need for wall outlet boxes which are currently used. Instead it substitutes a very small metal base plate, which is attached to the finished wall or outer surface thereof, such as a base board, with the projecting end of cable or electrical wiring cord threaded through the small hole in the plate. The two or three wires or conductors thereof are attached to the fixed terminals or contacts which are adapted for plug-in connection with the cover or box 18. The contact terminals may be protected by an insulating element so that when the cover plate is removed the interior of the box is safe against accidental contact. The cover plate or box contains all of the plug contacts and the wiring completely so that its repair and inspection may be made with complete certainty of freedom from electrical shock.

The design of the wall box outlet is such that in a wall space less than that occupied by an existing standard duplex outlet, four or five electrical plugs may be inserted from four different directions all are parallel to the wall surface. Thus a plug may be inserted or removed without disturbing anything backed up against the box, such as heavy appliances or a piece of furniture. The method of insertion of the plugs parallel to the wall aids in preventing their breakage and the breakage of the cords.

The outlet box per se as shown in FIG. 4 may be constructed of a hard plastic or hard rubber or the like. The type of material used depends upon the type of usage. For example, phenolic or melamine resin plastics may be used for normal applications. Where heavier appliances will be placed in contact with the outlet box, nylon or hard rubber may be used as the material of construction.

Furthermore, the quadruple outlet box, in accordance with the invention and as shown and described, may have a rotary thumb wheel or rotary element exposed to the exterior thereof and connected to a variable resistor or other variable control element so that the output voltage may be raised or lowered for one or more of the outlet plug-in connections. The only wiring required for the outlet is the attachment of the conductors from the electrical wiring lead or cord in the wall to the terminals in the base or bracket. This device will then decrease the time for wiring new buildings in home construction and simplifies the installation of the outlets. The cover plate or box as noted, may have printed-circuit or prefabricated wiring elements fastened in place therein around the interior periphery of the box and thus will be stable and give a minimum of servicing problems in use.

One of the major advantages of the present outlet is that at least four plugs may be used with receptacles which are always available. Under existing conditions when a piece of equipment such as furniture, bookcases, heavy machinery, desks, etc. are placed against the wall where a duplex outlet is positioned, that duplex outlet is generally useless. However, with the present quadruplex outlet the electrical plugs may be used with the obstruction in contact with the outlet box. Each plug has its own receptacle or contacts, and the device may be made to house more than four plug receptacles, depending upon the need and the space available. In all cases, the parallel method of insertion of the plugs is space saving and more efficient than existing outlets. Also, if thin electrical plugs are used, the thickness of the wall box outlet extending from the surface of the wall can be kept at a minimum and generally within three-quarters of an inch.

In manufacturing plans, and the like, the novel outlet of the present invention permits the placing of electronic instrumentation, gas chromatographs, electrical refrigerating equipment, baking ovens, and other electrical equipment and apparatus practically in contact with the wall surface. This advantage permits the saving of considerable laboratory space with some types of electrical apparatus. The feature of the quadruple outlet, that it permits the insertion of the outlet plugs for various pieces of apparatus in parallel relation to the wall here, more than in home use, prevents the breaking of cords and plugs when equipment is backed against the wall box.

I claim:

1. An electrical wall outlet comprising in combination:
   a bracket plate having an opening therein for receiving an electrical conductor cord therethrough and providing a base for said wall outlet,
   a relatively-shallow rectangular box-like cover element seated on said base and secured thereto with the base as a rear closure means therefor,
   a plurality of internal plug receptacles carried by said cover element along the sides and ends thereof exclusive of the front and having external plug-in connector openings in registration therewith,
   a plurality of electrical supply conductors for said plug receptacles carried by the inner walls of said cover element and extending around the ends and sides thereof in spaced parallel relation,
   a fixed electrical connection block carried by said base having contact elements provided with terminals for electrically attaching said conductor cord,
   a plurality of plug contacts in the cover element connected one with each of said supply conductors and positioned to engage said base contact elements to provide connection therewith,
   means providing a gap in one of the conductors in the cover element to electrically disconnect at least one plug receptacle,
   a circuit controlling device in the cover element connected to bridge said gap, and
   an external operating element for said device extending through one of the said sides and ends of said cover element.

2. An electrical wall outlet comprising in combination:
   a bracket plate having an opening therein for receiving an electrical conductor cord therethrough and providing a base for said wall outlet,
   a relatively-shallow rectangular box-like cover element seated on said base and secured thereto with the base as a rear closure means therefor,
   a plurality of internal plug receptacles carried by said cover element along the sides and ends thereof exclusive of the front and having external plug-in connector openings in registration therewith,
   a plurality of electrical supply conductors for said plug receptacles carried by the inner walls of said cover element and extending around the ends and sides thereof in spaced parallel relation,
   a fixed electrical connection block carried by said base having contact elements provided with terminals for electrically attaching said conductor cord,
   a plurality of plug contacts in the cover element connected one with each of said supply conductors and positioned to engage said base contact elements to provide connection therewith,
   said cover element being of moulded plastic material with the supply conductors applied thereto as printed-circuit elements, and
   a variable resistor device connected serially in one of the conductors for controlling the voltage applied to one or more of said plug receptacles.

3. An improved electrical wall outlet to eliminate inset wall boxes in building wiring for electrical outlets and to provide a plurality of plug-in connections in parallel relation to said wall surface as a protective feature for the conductors thereof and unimpeded use in the presence of abutting furniture and equipment items in homes and industrial locations,
   said wall outlet comprising a thin metallic wall-mounting base plate having an opening for receiving therethrough an electrical conductor cord for connection with said outlet,
   a hollow rectangular cover element open only at the rear thereof and seated on said base element as a closure means therefor,
   a plurality of electircal conductor elements extending around the interior of said cover element along the side and end walls thereof,
   electrical plug-in socket elements having a plurality of contacts mounted on the interior of said cover element in connection with said conductors and having a plurality of corresponding plug-in openings in the sides and end thereof aligned with said contacts,
   means providing plug-in detachable electrical connections between the base and said cover element,
   said last-named means including recessed contact elements on the base plate and corresponding projecting contact elements in the cover element for engaging therewith and
   interconnecting means carried by said base plate and cover element for releasably attaching one to the other in fixed relation in use.

4. An improved electrical wall outlet as defined in claim 3, wherein at least one of the conductors in the cover element is broken at a predetermined point to isolate one of said outlet socket elements electrically from the remainder of the wiring, and wherein a rheostat control element is inserted in the wiring for said last named socket element to vary the voltage output thereto as a dimmer element with control means therefor exposed through said cover element for manual operation.

References Cited

UNITED STATES PATENTS

| | | | |
|---|---|---|---|
| 2,291,107 | 7/1941 | Rybolt | 174—53 X |
| 2,443,367 | 6/1948 | Aguilar et al. | 339—170 X |

LEWIS H. MYERS, *Primary Examiner.*

DAVID H. MYERS, *Assistant Examiner.*

U.S. Cl. X.R.

339—122